(12) United States Patent
DeVaul et al.

(10) Patent No.: US 9,340,272 B1
(45) Date of Patent: May 17, 2016

(54) ALTITUDE CONTROL VIA ADJUSTMENT TO MASS OF AIR IN BLADDER WITHIN LIFT-GAS FILLED ENVELOPE

(71) Applicant: Google Inc., Mountain View, CA (US)

(72) Inventors: Richard Wayne DeVaul, Mountain View, CA (US); Clifford L. Biffle, Mountain View, CA (US)

(73) Assignee: Google Inc., Mountain View, CA (US)

( * ) Notice: Subject to any disclaimer, the term of this patent is extended or adjusted under 35 U.S.C. 154(b) by 162 days.

(21) Appl. No.: 14/321,374

(22) Filed: Jul. 1, 2014

Related U.S. Application Data

(60) Provisional application No. 61/882,393, filed on Sep. 25, 2013.

(51) Int. Cl.
*B64B 1/58* (2006.01)
*B64B 1/62* (2006.01)
*B64B 1/70* (2006.01)

(52) U.S. Cl.
CPC .... *B64B 1/62* (2013.01); *B64B 1/70* (2013.01)

(58) Field of Classification Search
CPC ........................................................ B64B 1/58
USPC ........................................................... 244/98
See application file for complete search history.

(56) References Cited

U.S. PATENT DOCUMENTS

| | | | | |
|---|---|---|---|---|
| 4,498,408 A * | 2/1985 | Otteblad | ................... | B63C 7/10 114/52 |
| 6,648,272 B1 * | 11/2003 | Kothmann | .............. | B64B 1/005 244/30 |
| 6,966,523 B2 * | 11/2005 | Colting | .................... | B64B 1/02 244/30 |
| 7,469,857 B2 * | 12/2008 | Voss | ......................... | B64B 1/60 244/96 |
| 8,733,697 B2 * | 5/2014 | DeVaul | ................... | G05D 1/042 244/126 |
| 8,880,326 B1 * | 11/2014 | Bonawitz | ................. | G08G 5/00 701/120 |
| 8,967,533 B2 * | 3/2015 | DeVaul | .................... | B64B 1/40 244/96 |
| 9,033,274 B2 * | 5/2015 | DeVaul | .................... | B64B 1/62 244/31 |
| 2002/0179771 A1 * | 12/2002 | Senepart | ................... | B64B 1/70 244/97 |

\* cited by examiner

*Primary Examiner* — Brian M O'Hara
*Assistant Examiner* — Keith L Dixon
(74) *Attorney, Agent, or Firm* — McDonnell Boehnen Hulbert and Berghoff LLP

(57) ABSTRACT

This disclosure relates to the use of a method for adjusting an altitude of variable-buoyancy vehicle, such as an aerostatic balloon. The method includes determining a target mass for a variable-buoyancy vehicle, where the target mass is based on a target altitude for the variable-buoyancy vehicle. Additionally, the method includes adding a first mass to the variable-buoyancy vehicle. The mass added is less than a difference between the target mass and a current mass. The method also includes adding a second mass to the variable-buoyancy vehicle in response to a decrease in an internal pressure of the variable-buoyancy vehicle caused by adding the first mass. Further, adding the second mass makes a current mass of the variable-buoyancy vehicle approximately equal to the target mass.

20 Claims, 8 Drawing Sheets

ALTITUDE CONTROL VIA ADJUSTMENT TO MASS OF AIR IN BLADDER WITHIN LIFT-GAS FILLED ENVELOPE

CROSS REFERENCE TO RELATED APPLICATIONS

The present application claims priority to U.S. Provisional Patent Application Ser. No. 61/882,393, filed on Sep. 25, 2013, the entire contents of which are herein incorporated by reference.

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In order to adjust the altitude of a variable-buoyancy vehicle, such as a balloon, air is either added or removed from inside the variable-buoyancy vehicle. To increase altitude, air is removed; to decrease altitude, air is added. Air is added to the balloon via a pumping mechanism. The pumping mechanism uses a portion of the energy reserve of the balloon. Therefore, an efficient method of adding air may help extend the energy resources of the balloon.

In one aspect, the present disclosure features a method for adjusting an altitude of variable-buoyancy vehicle. The method includes determining a target mass for a variable-buoyancy vehicle, where the target mass is based on a target altitude for the variable-buoyancy vehicle. Additionally, the method includes adding a first mass to the variable-buoyancy vehicle. Adding the first mass causes both a pressure increase inside the variable-buoyancy vehicle and the altitude of the variable-buoyancy vehicle to decrease. The mass added is less than a difference between the target mass and a current mass. The method also includes adding a second mass to the variable-buoyancy vehicle in response to a decrease in an internal pressure of the variable-buoyancy vehicle caused by adding the first mass. Further, adding the second mass makes a current mass of the variable-buoyancy vehicle approximately equal to the target mass.

In some embodiments, the method also includes determining the internal pressure of the variable-buoyancy vehicle after adding the first mass. The second mass is added in response to the internal pressure falling below a threshold pressure. Additionally, the threshold pressure may be selected based on a power consumption of a pump of the variable-buoyancy vehicle. In other embodiments, the method includes the decrease internal pressure having an associated delay time and adding the second mass is after the delay time. Further, in some embodiments, the variable-buoyancy vehicle may take the form of an aerostatic balloon.

In a second aspect, the present disclosure features an aerostatic balloon. The aerostatic balloon includes an envelope configured to hold air and a bladder configured to hold lift gas. The bladder of the aerostatic balloon is located within the envelope. The aerostatic balloon also includes a control unit configured to add or remove air from the envelope in order to change a mass of air in the envelope. Further, the aerostatic balloon includes a processing unit. The processing unit is configured to determine a target mass for the aerostatic balloon, based on a target altitude for the aerostatic balloon. Additionally, the processing unit is configured to cause the control unit to add a first mass to the aerostatic balloon, wherein the mass added is less than a difference between the target mass and a current mass. Further, in response to a decrease in an internal pressure of the aerostatic balloon, the processing unit is configured to cause the control unit to add a second mass to aerostatic balloon. The pressure of the aerostatic balloon decreases based on the first adding mass and adding second mass added makes a current mass of the variable-buoyancy vehicle approximately equal to the target mass.

In some embodiments, the processing unit is further configured to determine the internal pressure of the aerostatic balloon after adding the first mass. The processing unit may be further configured to add the second mass in response to the internal pressure falling below a threshold. The threshold may be selected based on a power consumption of the control unit of the aerostatic balloon. In additionally embodiments, the decrease in the internal pressure of the aerostatic balloon has an associated delay time. The processing unit may be configured to add the second mass to be after the delay time.

In a third aspect, the present disclosure features an article of manufacture including a non-transitory computer-readable medium having stored thereon program instructions that, if executed by a processor in a balloon-control system, cause the balloon-control system to perform operations. The operations include determining a target mass for a variable-buoyancy vehicle, where the target mass is based on a target altitude for the variable-buoyancy vehicle. Additionally, the operations include adding a first mass to the variable-buoyancy vehicle. The mass added is less than a difference between the target mass and a current mass. The operations also include adding a second mass to the variable-buoyancy vehicle in response to a decrease in an internal pressure of the variable-buoyancy vehicle caused by adding the first mass. Further, operations include adding the second mass makes a current mass of the variable-buoyancy vehicle approximately equal to the target mass.

In some embodiments, the operations also include determining the internal pressure of the variable-buoyancy vehicle after adding the first mass. The second mass is added in response to the internal pressure falling below a threshold pressure. Additionally, the threshold pressure may be selected based on a power consumption of a pump of the variable-buoyancy vehicle. In other embodiments, the operations include the decrease internal pressure having an associated delay time and adding the second mass is after the delay time. Further, in some embodiments, the variable-buoyancy vehicle may take the form of an aerostatic balloon.

In some examples, the operations may include balloon parameters having an associated global location. Additionally, communicating the fill-rate control plan may include communicating instructions for changing the balloon parameters. In some embodiments, the communication may be performed wirelessly. Operations may also include instructions for changing the balloon parameters, such as instructions for operating an impeller powered by renewable energy.

DETAILED DESCRIPTION

I. Overview

Figure 1:
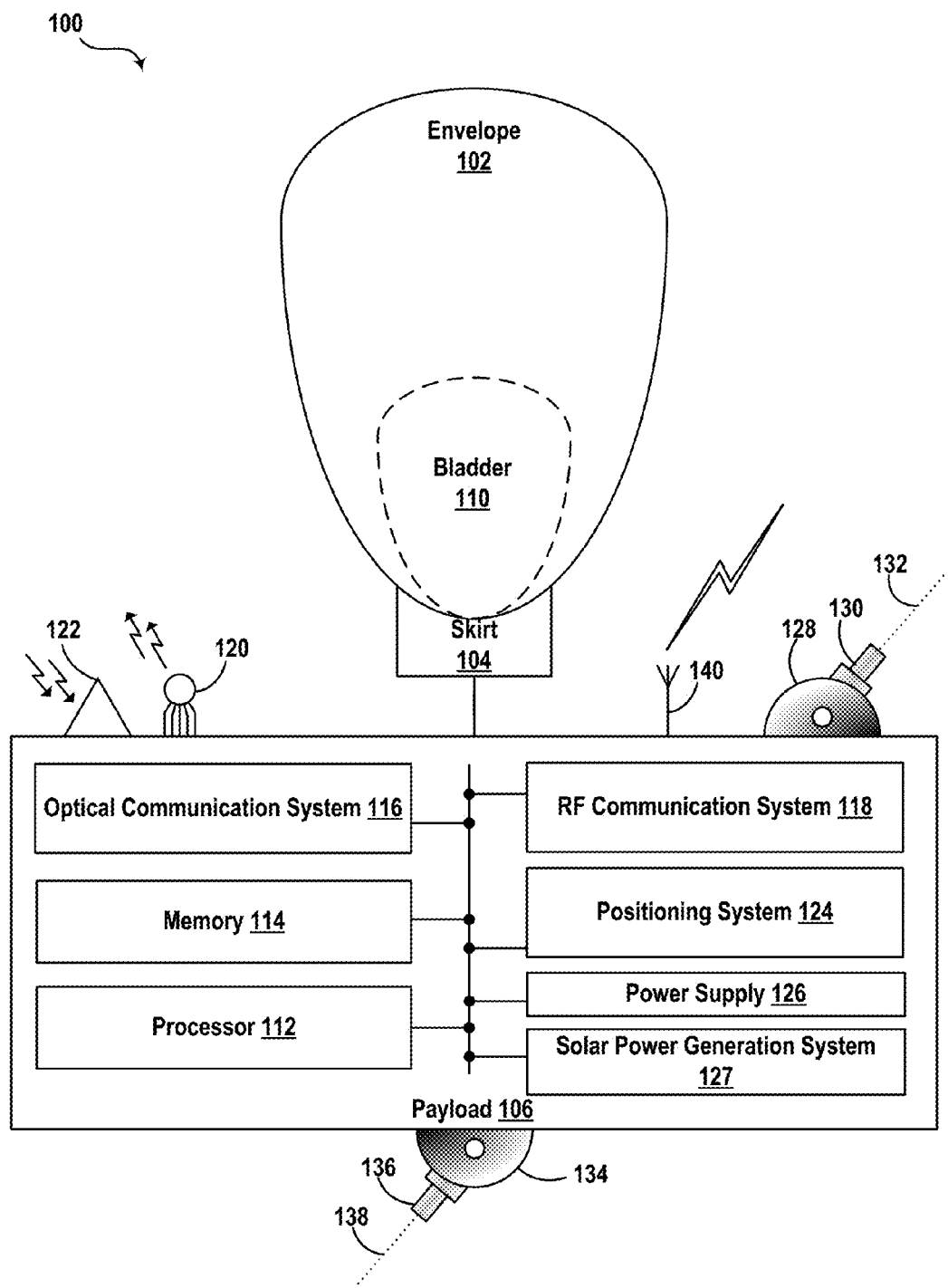
FIG. 1 illustrates a high-altitude balloon, according to an embodiment.

Illustrative embodiments can implement a method for adjusting an altitude of a super pressure aerostatic balloon with a data network of balloons, such as, for example, a mesh network of high-altitude balloons deployed in the stratosphere. The method for adjusting the altitude can reconfigure the altitude of a balloon in a way to reduce energy usage, possibly operating in a balloon network, in situations when the balloon network is needed or desired to supplement a cellular network, among other situations. The balloon network can be useful for supplementing the cellular network in various scenarios. For example, the balloon network can be a useful supplement when the cellular network has reached capacity. As another example, the balloon network can be a useful supplement when the cellular network provides insufficient coverage in a given area.

In order to adjust the altitude of the balloon, air is either added or removed from inside the balloon. Air is added to the balloon via a pumping mechanism. However, the pumping mechanism uses a portion of the energy reserve of the balloon and the energy reserve is a precious resource for the balloon. Therefore, an efficient method of adding may help extend the energy resources of the balloon. The method for adjusting the altitude of the balloon includes determining a target mass for the balloon based on a target altitude for the balloon. Next, an amount of air is added to the balloon with the pump. The amount of air added is less than the amount needed for the balloon to equal the target mass. When the mass is added, the pressure in the balloon increases, causing the balloon to decrease altitude.

In response to the decrease in altitude, the internal pressure within the balloon may fall. The internal pressure of the balloon may fall enough to where the current pressure within the balloon is less than initial pressure when the air was added. When the current pressure is less than the initial pressure, the pump requires less energy to add air inside the balloon; thus, there is an energy savings. Therefore, at the time when the internal pressure is less than the initial internal pressure, the balloon adds a second mass to makes a current mass of the variable-buoyancy vehicle approximately equal to the target mass.

To this end, an illustrative embodiment uses a central control system that is configured to operate with the balloon network with balloons flying at various altitudes. During operation of the network, balloons may need to change altitude. However, in order to have an extended period of flight, it may be desirable to use renewable resources when adjusting the altitude of the balloon, and if possible, to use renewable resources exclusively. Embodiments also include the central control system changing the altitudes of various balloons in a coordinated effort to form a balloon network, as disclosed herein.

Traditional balloons may add or vent lift gas (e.g., helium) in order to change altitude. However, when the helium supply is gone, the balloon may not be able to increase altitude. Thus, the method of optimally controlling altitude presented herein uses ambient air so that there is not a finite supply for each balloon flight. Further, the method of optimally controlling altitude may also include adding or removing air using only a renewable power source, such as solar power.

In one example embodiment, a balloon features solar charging units configured to receive sunlight and convert it to energy. This energy can be both stored in batteries and used to power components of the balloon. The balloon also includes a control unit configured to selectively add or remove air from the inside of the balloon. Air that is added comes from the environment in which the balloon is located. Further, the control unit is powered by the energy stored in the batteries and provided by the solar charging units. Thus, the balloon may be able to add or remove gas from the balloon without depleting a gas source and by only using power that can be renewed via sunlight.

Disclosed herein are methods and apparatuses configured to control the altitude of a balloon that may form a portion of a communication network. However, this disclosure is not limited to a network of balloons and similar methods and apparatuses. The disclosed methods and apparatuses may also function with a single balloon, a high-altitude platform, or other variable-buoyancy vehicles, such as submarines.

II. Balloon Configuration

FIG. 1 illustrates a high-altitude balloon 100, according to an embodiment. The balloon 100 includes an envelope 102, a skirt 104, and a payload 106.

The envelope 102 and the skirt 104 can take various forms, which can be currently well-known or yet to be developed. For instance, the envelope 102, the skirt 104, or both can be made of metalized Mylar® or BoPET (biaxially-oriented polyethylene terephthalate). Some or all of the envelope 102, the skirt 104, or both can be constructed from a highly-flexible latex material or a rubber material, such as, for example, chloroprene. These examples are illustrative only; other materials can be used as well. Further, the shape and size of the envelope 102 and the skirt 104 can vary depending upon the particular implementation. Additionally, the envelope 102 can be filled with various different types of gases, such as, for example, helium, hydrogen, or both. These examples are illustrative only; other types of gases can be used as well.

The payload 106 of the balloon 100 includes a processor 112 and memory 114. The memory 114 can be or include a non-transitory computer-readable medium. The non-transitory computer-readable medium can have instructions stored thereon, which can be accessed and executed by the processor 112 in order to carry out some or all of the functions provided in this disclosure.

The payload 106 of the balloon 100 can also include various other types of equipment and systems to provide a number of different functions. For example, the payload 106 includes an optical communication system 116. The optical communication system 116 can transmit optical signals by way of an ultra-bright LED system 120. In addition, the optical communication system 116 can receive optical signals by way of an optical-communication receiver, such as, for example, a photo-diode receiver system. Further, the payload 106 can include an RF communication system 118. The RF communication system 118 can transmit and/or receive RF communications by way of an antenna system 140.

In addition, the payload 106 includes a power supply 126. The power supply 126 can be used to provide power to the various components of the balloon 100. The power supply 126 can be or include a rechargeable battery. In some implementations, the power supply 126 can represent another suitable power supply known in the art for producing power. In addition, the balloon 100 includes a solar power generation system 127. The solar power generation system 127 can include solar panels, which can be used to generate power for charging the power supply 126 or for distribution by the power supply 126. In some embodiments, it may be desirable for the balloon system to run off sustainable power. Therefore, all energy used by the balloon system from power supply 126 may be provided from a renewable source, such as solar power generation system 127.

Further, the payload 106 includes various types of sensors 128. The payload 106 can include sensors such as, for example, video or still cameras, a GPS system, motion sensors, accelerometers, gyroscopes, compasses, or sensors for capturing environmental data. These examples are illustrative only; the payload 106 can include various other types of sensors. Further, some or all of the components in the payload 106 can be implemented in a radiosonde, which can be operable to measure various types of information, such as, for example, pressure, altitude, geographical position (latitude and longitude), temperature, relative humidity, wind speed, or direction, among other information.

As noted above, the payload 106 includes an ultra-bright LED system 120. In some implementations, the ultra-bright LED system 120 can be used for free-space optical communication with other balloons. In some implementations, the ultra-bright LED system 120 can be used for free-space optical communication with satellites. In some implementations, the ultra-bright LED system 120 can be used for free-space optical communication both with other balloons and with satellites. To this end, the optical communication system 116 can be configured to transmit a free-space optical signal by causing modulations in the ultra-bright LED system 120. The manner in which the optical communication system 116 is implemented can vary, depending upon the particular application.

In addition, the balloon 100 can be configured for altitude control. For instance, the balloon 100 can include a variable buoyancy system. The buoyancy system can be configured to change the altitude of the balloon 100 by adjusting the volume, the density, or both of the gas in the envelope 102 of the balloon 100. A variable buoyancy system can take various forms, and can generally be any system that can change the volume and/or density of gas in the envelope 102 of the balloon 100.

In an embodiment, a variable buoyancy system can include a bladder 110 that is located inside of the envelope 102. The bladder 110 can be an elastic chamber that is configured to hold liquid and/or gas. Alternatively, the bladder 110 need not be inside the envelope 102. For instance, the bladder 110 can be a rigid bladder that can be pressurized well beyond neutral pressure. The buoyancy of the balloon 100 can therefore be adjusted by changing the density and/or volume of the gas in the bladder 110. To change the density in the bladder 110, the balloon 100 can be configured with systems and/or mechanisms for heating and/or cooling the gas in the bladder 110. Further, to change the volume, the balloon 100 can include pumps or other features for adding gas to and/or removing gas from the bladder 110. To change the volume of the bladder 110, the balloon 100 can include release valves or other features that are controllable to allow gas to escape from the bladder 110. Multiple bladders 110 can be implemented within the scope of this disclosure. For instance, multiple bladders can be used to improve balloon stability.

In an embodiment, the envelope 102 can be filled with helium, hydrogen, or other material that is lighter than air. Thus, the envelope 102 can have an associated upward buoyancy force. In this embodiment, air in the bladder 110 can be considered a ballast tank that can have an associated downward ballast force. In another embodiment, the amount of air in the bladder 110 can be changed by pumping air (for example, with an air compressor) into and out of the bladder 110. By adjusting the amount of air in the bladder 110, the ballast force can be controlled. In some embodiments, the ballast force can be used, in part, to counteract the buoyancy force and/or to provide altitude stability.

In some embodiments, the envelope 102 can be substantially rigid and include an enclosed volume. Air can be evacuated from the envelope 102 while the enclosed volume is substantially maintained. In other words, at least a partial vacuum can be created and maintained within the enclosed volume. Thus, the envelope 102 and the enclosed volume can become lighter than air and provide a buoyancy force. In some embodiments, air or another material can be controllably introduced into the partial vacuum of the enclosed volume by a control unit in an effort to adjust the overall buoyancy force and/or to provide altitude control. Further, the envelope 102 may be coupled to a mass-changing unit, configured to function as the control unit. The mass-changing unit may be configured with an impeller configured to add or remove air from within the envelope 102. Additionally, the mass-changing unit may also include a vent configured to add or remove air from the envelope 102. A more detailed description of the altitude control system is described with respect to FIG. 5 herein.

In an embodiment, a portion of the envelope 102 can be a first color (for example, black) and/or a first material that is different from another portion or the remainder of the envelope 102. The other portion or the remainder of the envelope can have a second color (for example, white) and/or a second material. For instance, the first color and/or first material can be configured to absorb a relatively larger amount of solar energy than the second color and/or second material. Thus, rotating the balloon such that the first material is facing the sun can act to heat the envelope 102 as well as the gas inside the envelope 102. In this way, the buoyancy force of the envelope 102 can increase. By rotating the balloon such that the second material is facing the sun, the temperature of gas inside the envelope 102 can decrease. Accordingly, the buoyancy force can decrease. In this manner, the buoyancy force of the balloon can be adjusted by changing the temperature/volume of gas inside the envelope 102 using solar energy. In this embodiment, a bladder need not be an element of the balloon 100. Thus, in this embodiment, altitude control of the balloon 100 can be achieved, at least in part, by adjusting the rotation of the balloon 100 with respect to the sun.

Further, the payload 106 of the balloon 100 can include a navigation system (not shown in FIG. 1). The navigation system can implement station-keeping functions to maintain position within and/or move to a position in accordance with a desired topology. In particular, the navigation system can use altitudinal wind data to determine altitudinal adjustments that result in the wind carrying the balloon in a desired direction and/or to a desired location. The altitude-control system can then make adjustments to the density of the balloon chamber in order to effectuate the determined altitudinal adjustments and cause the balloon to move laterally to the desired direction and/or to the desired location.

Alternatively, the altitudinal adjustments can be computed by a ground-based control system and communicated to the high-altitude balloon. As another alternative, the altitudinal adjustments can be computed by a ground-based or satellite-based control system and communicated to the high-altitude balloon. Furthermore, in some embodiments, specific balloons in a heterogeneous balloon network can be configured to compute altitudinal adjustments for other balloons and transmit the adjustment commands to those other balloons.

In such an arrangement, the navigation system can be operable to navigate the balloon to a landing location, in the event the balloon needs to be removed from the network and/or accessed on the ground. Further, a balloon can be self-sustaining so that it does not need to be accessed on the ground. In some embodiments, a balloon can be serviced in-flight by one or more service balloons or by another type of service aerostat or service aircraft.

III. Balloon Networks

Figure 2:
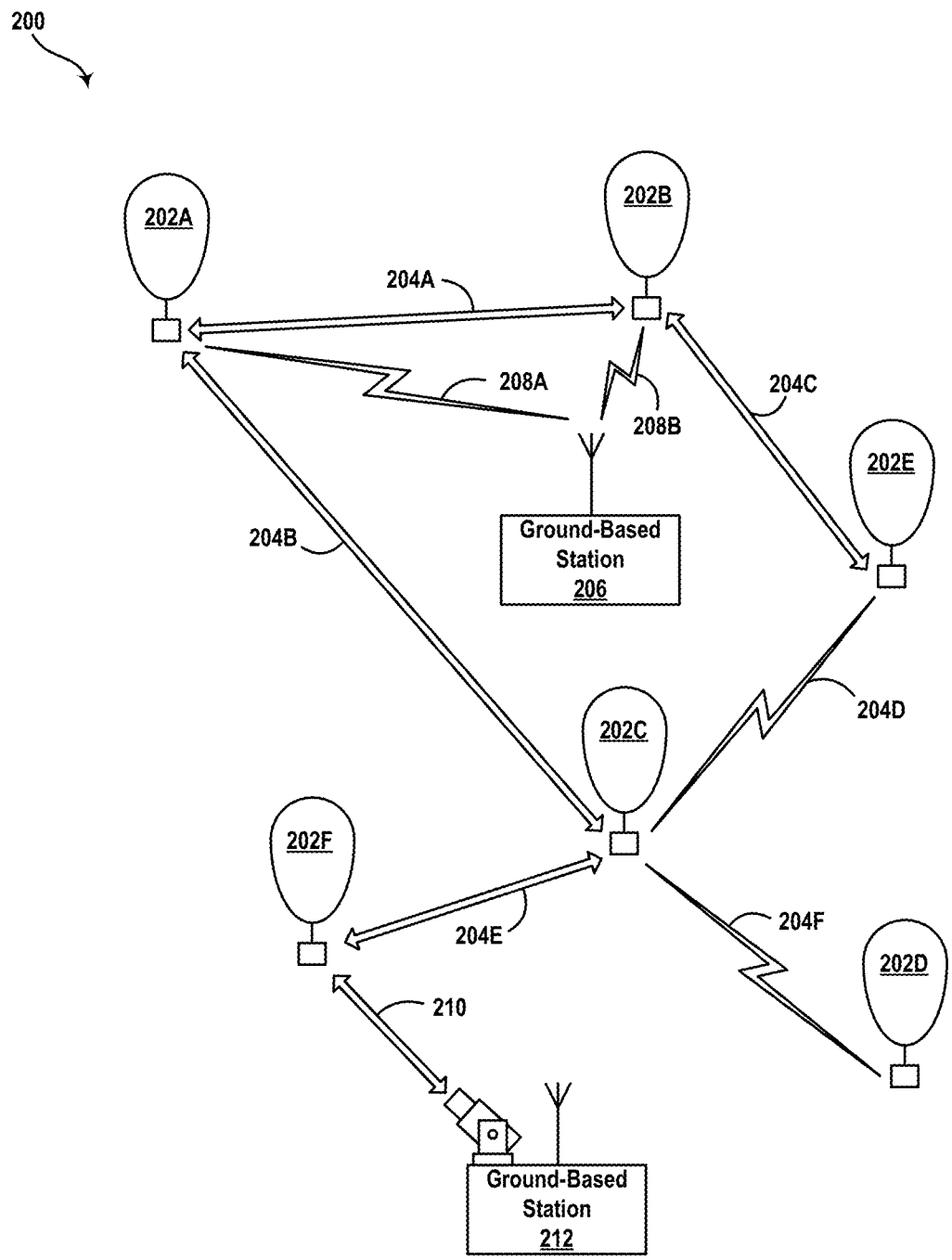
FIG. 2 illustrates a balloon network, according to an embodiment.

FIG. 2 illustrates a balloon network 200, according to an embodiment. The balloon network 200 includes balloons 202A-202F. The balloons 202A-202F are configured to communicate with one another by way of free-space optical links 204A-204F. Configured as such, the balloons 202A to 202F can collectively function as a mesh network for packet-data communications. Further, at least some of the balloons 202A-202F, such as, for example, the balloons 202A and 202B, can be configured for RF communications with a ground-based station 206 by way of respective RF links 208A and 208B. The ground-based station 206 represents one or more ground-based stations. In addition, some of the balloons 202A-202F, such as, for example, the balloon 202F, can be configured to communicate by way of an optical link 210 with a ground-based station 212. The ground-based station 212 represents one or more ground-based stations.

In an embodiment, the balloons 202A-202F are high-altitude balloons, which can be deployed in the stratosphere. At moderate latitudes, the stratosphere includes altitudes between approximately 10 kilometers (km) and 50 km above the Earth's surface. At the poles, the stratosphere starts at an altitude of approximately 8 km. In an embodiment, high-altitude balloons can be configured to operate in an altitude range within the stratosphere that has relatively low wind-speeds, such as, for example, between 5 and 20 miles per hour (mph).

In the high-altitude-balloon network 200, the balloons 202A-202F can be configured to operate at altitudes between 18 km and 25 km. In some implementations, the balloons 202A-202F can be configured to operate at other altitudes. The altitude range of 18 km-25 km can be advantageous for several reasons. In particular, this layer of the stratosphere generally has relatively low wind speeds (for example, winds between 5 and 20 mph) and relatively little turbulence. Further, while the winds in this altitude range can vary with latitude and by season, the variations can be modeled in a reasonably accurate manner. In addition, altitudes above 18 km are typically above the maximum flight level designated for commercial air traffic. Therefore, interference with commercial flights is not a significant concern when balloons are deployed between 18 km and 25 km.

To transmit data to another balloon, a given balloon 202A-202F can be configured to transmit an optical signal by way of a corresponding optical link 204A-204F. In an embodiment, some or all of the balloons 202A-202F can use one or more high-power light-emitting diodes (LEDs) to transmit an optical signal. Alternatively, some or all of the balloons 202A-202F can include laser systems for free-space optical communications over corresponding optical links 204A-204F. Other types of free-space optical communication are possible. Further, in order to receive an optical signal from another balloon by way of an optical link, a given balloon 202A-202F can include one or more optical receivers, as discussed above in connection with FIG. 1.

The balloons 202A-202F can utilize one or more of various different RF air-interface protocols for communication with ground-based stations, such as, for example, the ground-based station 206. For instance, some or all of the balloons 202A-202F can be configured to communicate with the ground-based station 206 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

There can be scenarios where the RF links 208A-208B do not provide a desired link capacity for balloon-ground communications. For instance, increased capacity can be desirable to provide backhaul links from a ground-based gateway. Accordingly, a balloon network can also include downlink balloons, which can provide a high-capacity air-ground link.

For example, in the balloon network 200, the balloon 202F is configured as a downlink balloon. Like other balloons in the balloon network 200, the downlink balloon 202F can be operable for optical communication with other balloons by way of corresponding optical links 204A-204F. The downlink balloon 202F can also be configured for free-space optical communication with the ground-based station 212 by way of the optical link 210. The optical link 210 can therefore serve as a high-capacity link (as compared to the RF links 208A-208B) between the balloon network 200 and the ground-based station 212.

Note that in some implementations, the downlink balloon 202F can be operable for RF communication with the ground-based stations 206. In other implementations, the downlink balloon 202F may only use the optical link 210 for balloon-to-ground communications. Further, while the arrangement shown in FIG. 2 includes one downlink balloon 202F, a balloon network can also include multiple downlink balloons. In addition, a balloon network can be implemented without the use of any downlink balloons.

In some implementations, a downlink balloon can be equipped with a specialized, high-bandwidth RF communication system for balloon-to-ground communications, instead of, or in addition to, a free-space optical communication system. The high-bandwidth RF communication system can take the form of an ultra-wideband system, which can provide an RF link with substantially the same capacity as one of the optical links 204A-204F.

Ground-based stations, such as the ground-based stations 206 and 212, can take various forms. Generally, a ground-based station includes components such as transceivers, transmitters, and receivers for communication with a balloon network by way of RF links, optical links, or both. Further, a ground-based station can use various air-interface protocols in order to communicate with one or more of the balloons 202A-202F by way of an RF link. As such, a ground-based station 206 can be configured as an access point by which various devices can connect to the balloon network 200. The ground-based station 206 can have other configurations and can serve other purposes without departing from the scope of this disclosure.

Some or all of the balloons 202A-202F can be configured to establish a communication link with space-based satellites by way of corresponding communication links. The balloons can establish the communication links with the space-based satellites in addition to, or as an alternative to, the ground-based communication links. In addition, the balloons can be configured to communicate with the space-based satellites using any suitable protocol. In some implementations, one or more of the communication links can be optical links. Accordingly, one or more of the balloons can communicate with the satellites by way of free-space optical communication. Other balloon-satellite communication links and techniques can be used.

Further, some ground-based stations, such as, for example, the ground-based station 206, can be configured as gateways between the balloon network 200 and another network. For example, the ground-based station 206 can serve as an interface between the balloon network 200 and the Internet, a cellular service provider's network, or another network.

A. Mesh-Network Functionality

As noted above, the balloons 202A-202F can collectively function as a mesh network. More specifically, because the balloons 202A-202F can communicate with one another using free-space optical links, the balloons can collectively function as a free-space optical mesh network.

In a mesh-network configuration, each of the balloons 202A-202F can function as a node of the mesh network. The mesh network can be operable to receive data directed to it and to route data to other balloons. As such, data can be routed from a source balloon to a destination balloon by determining an appropriate sequence of optical links between the source balloon and the destination balloon. This disclosure may refer to these optical links, collectively, as a "lightpath" for the connection between the source and destination balloons. Further, this disclosure may refer to each of the optical links as a "hop" along the lightpath.

To operate as a mesh network, the balloons 202A-202F can employ various routing techniques and self-healing algorithms. In some implementations, the balloon network 200 can employ adaptive or dynamic routing, in which a lightpath between a source balloon and a destination balloon is determined and set-up when the connection is needed, and is released at a later time. Further, when adaptive routing is used, the lightpath can be determined dynamically, depending upon the current state, past state, and/or predicted state of the balloon network.

In addition, the network topology can change as the balloons 202A-202F move relative to one another and/or relative to the ground. Accordingly, the balloon network 200 can apply a mesh protocol to update the state of the network as the topology of the network changes. For example, to address the mobility of the balloons 202A-202F, the balloon network 200 can employ and/or adapt various techniques that are employed in mobile ad hoc networks (MANETs).

In some implementations, the balloon network 200 can be configured as a transparent mesh network. In a transparent balloon network, the balloons can include components for physical switching in a way that is entirely optical, without involving a substantial number of, or any, electrical components in the physical routing of optical signals. Accordingly, in a transparent configuration with optical switching, signals can travel through a multi-hop lightpath that is entirely optical.

In other implementations, the balloon network 200 can implement a free-space optical mesh network that is opaque. In an opaque configuration, some or all of the balloons 202A-202F can implement optical-electrical-optical (OEO) switching. For example, some or all of the balloons 202A-202F can include optical cross-connects (OXCs) for OEO conversion of optical signals. This example is illustrative only; other opaque configurations can be used.

The balloons 202A-202F in the balloon network 200 can utilize techniques such as wavelength division multiplexing (WDM) in order to increase link capacity. When WDM is implemented with transparent switching, physical lightpaths through the balloon network can be subject to the wavelength continuity constraint. In particular, because switching in a transparent network is entirely optical, it can be necessary, in some instances, to assign the same wavelength to all optical links along a given lightpath.

An opaque configuration can be used to avoid the wavelength continuity constraint. In particular, balloons in an opaque balloon network can include OEO switching systems operable for wavelength conversion. As a result, balloons can convert the wavelength of an optical signal at corresponding hops along a lightpath.

Further, various routing algorithms can be employed in an opaque configuration. For example, to determine a primary lightpath and/or one or more diverse backup lightpaths for a given connection, a balloon can apply shortest-path routing techniques, such as, for example, Dijkstra's algorithm and k-shortest path. In addition, a balloon can apply edge and node-diverse or disjoint routing, such as, for example, Suurballe's algorithm. Further, a technique for maintaining a particular quality of service (QoS) can be employed when determining a lightpath.

B. Station-Keeping Functionality

In an embodiment, a balloon network 100 can implement station-keeping functions to help provide a desired network topology. For example, station-keeping can involve each of the balloons 202A-202F maintaining a position or moving to a position relative to one or more other balloons in the network 200. The station-keeping can also, or instead, involve each of the balloons 202A-202F maintaining a position or moving to a position relative to the ground. Each of the balloons 202A-202F can implement station-keeping functions to determine the given balloon's desired positioning in the desired topology, and if desirable, to determine how the given balloon is to move to the desired position.

The network topology can vary depending on the desired implementation. In an implementation, the balloons 202A-202F can implement station-keeping such that the balloon network 200 has a substantially uniform topology. For example, a given balloon can implement station-keeping functions to position itself at substantially the same distance (or within a certain range of distances) from adjacent balloons in the balloon network. In another implementation, the balloons 202A-202F can implement station-keeping such that the balloon network 200 has a substantially non-uniform topology. This implementation can be useful when there is a need for balloons to be distributed more densely in some areas than in others. For example, to help meet higher bandwidth demands that are typical in urban areas, balloons can be clustered more densely over urban areas than in other areas. For similar reasons, the distribution of balloons can be denser over land than over large bodies of water. These examples are illustrative only; non-uniform topologies can be used in other settings.

In addition, the topology of a balloon network can be adaptable. In particular, balloons can utilize station-keeping functionality to allow the balloons to adjust their respective positioning in accordance with a change in the topology of the network. For example, several balloons can move to new positions in order to change a balloon density in a given area.

In an implementation, the balloon network 200 can employ an energy function to determine whether balloons should move in order to provide a desired topology. In addition, the energy function can indicate how the balloons should move in order to provide the desired topology. In particular, a state of a given balloon and states of some or all nearby balloons can be used as inputs to an energy function. The energy function can apply the states to a desired network state, which can be a state corresponding to the desired topology. A vector indicating a desired movement of the given balloon can then be determined by determining a gradient of the energy function. The given balloon can then determine appropriate actions to take in order to effectuate the desired movement. For example, a balloon can determine an altitude adjustment or adjustments such that winds will move the balloon in the desired manner.

C. Control of Balloons in a Balloon Network

Figure 3:
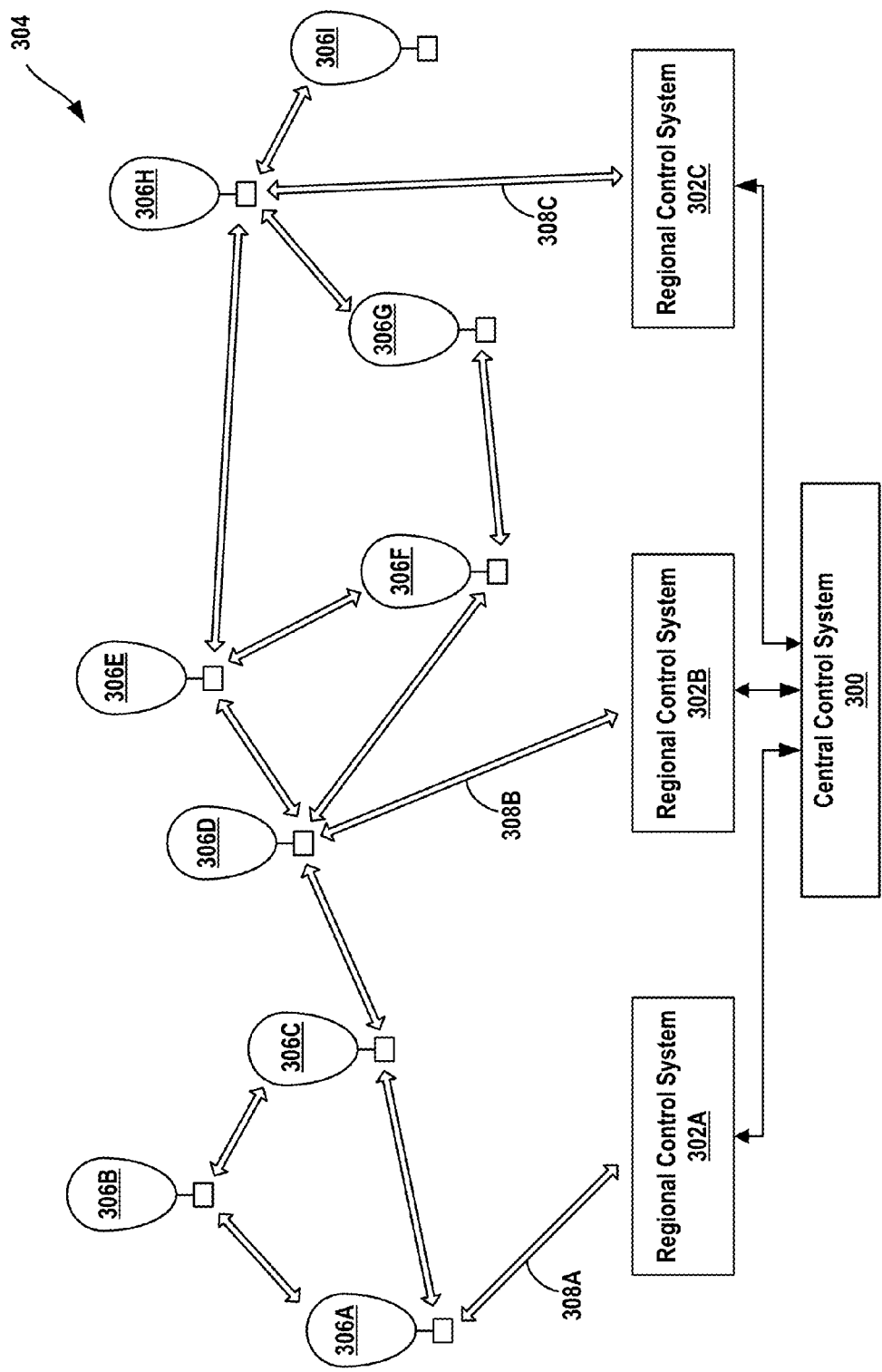
FIG. 3 illustrates a centralized system for controlling a balloon network, according to an embodiment.

Mesh networking, station-keeping functions, or both can be centralized. For example, FIG. 3 illustrates a centralized system for controlling a balloon network 304. In particular, a central control system 300 is in communication with regional control-systems 302A-302C. The central control system 300 can be configured to coordinate functionality of the balloon network 304. To this end, the central control system 300 can control functions of balloons 306A to 306I.

The central control system 300 can communicate with the balloons 306A-306I by way of the regional control systems 302A-302C. Each of the regional control systems 302A-302C can be a ground-based station, such as, for example, the ground-based station 206 discussed above in connection with FIG. 2. Each of the regional control systems 302A-302C can cover a different geographic area. The geographic areas can overlap or be separate. Each of the regional control systems 302A-302C can receive communications from balloons in the respective regional control system's area. In addition, each of the regional control systems 302A-302C can aggregate data from balloons in the respective regional control system's area. The regional control systems 302A-302C can send information they receive to the central control system 300. Further, the regional control systems 302A-302C can route communications from the central control system 300 to the balloons 306A-306I in their respective geographic areas. For instance, the regional control system 302A can relay communications between the balloons 306A-306C and the central control system 300. Likewise, the regional control system 302B can relay communications between the balloons 306D-306F and the central control system 300. Likewise, the regional control system 302C can relay communications between the balloons 306G-306I and the central control system 300.

To facilitate communications between the central control system 300 and the balloons 306A-306I, some of the balloons 306A-306I can serve as downlink balloons. The downlink balloons can communicate with the regional control systems 302A-302C. Accordingly, each of the regional control systems 302A-302C can communicate with a downlink balloon in the geographic area that the regional control system covers. In the balloon network 304, the balloons 306A, 306D, and 306H serve as downlink balloons. The regional control system 302A can communicate with the downlink balloon 306A by way of communication link 308A. Likewise, the regional control system 302B can communicate with the downlink balloon 306D by way of communication link 308B. Likewise, the regional control system 302C can communicate with the balloon 306H by way of communication link 308C. The communication links 308A-308C can be optical links or RF links, depending on the desired implementation.

In the balloon network 304, three of the balloons serve as downlink balloons. In an implementation, all of the balloons in a balloon network can serve as downlink balloons. In another implementation, fewer than three balloons or more than three balloons in a balloon network can serve as downlink balloons.

The central control system 300 can coordinate mesh-networking functions of the balloon network 304. For example, the balloons 306A-306I can send the central control system 300 state information. The central control system 300 can utilize the state information to determine the state of the balloon network 304. State information from a given balloon can include data such as, for example, location data identifying the relative or absolute location of the balloon. In addition, the state information from the given balloon can include data representing wind speeds near the balloon. In addition, the state information from the given balloon can include information about an optical link that the balloon has established. For example, the information about the optical link can include the identity of other balloons with which the balloon has established an optical link, the bandwidth of the optical link, wavelength usage, or availability on an optical link. Accordingly, the central control system 300 can aggregate state information from some or all of the balloons 306A-306I in order to determine an overall state of the balloon network 304.

The overall state of the balloon network 304 can be used to coordinate mesh-networking functions, such as, for example, determining lightpaths for connections. For example, the central control system 300 can determine a current topology based on the aggregate state information from some or all of the balloons 306A-306I. The topology can indicate which optical links are available in the balloon network 304. In addition, the topology can indicate which wavelengths are available for use with the links. The central control system 300 can send the topology to some or all of the balloons 306A-306I so that a routing technique can be employed to select appropriate lightpaths (and possibly backup lightpaths) for communications that use the balloon network 304.

In addition, the central control system 300 can coordinate station-keeping functions of the balloon network 304. For example, the central control system 300 can receive state information from the balloons 306A-306I, as discussed above, and can use the state information as an input to an energy function. The energy function can compare the current topology of the network to a desired topology and, based on the comparison, provide a vector indicating a direction of movement (if any) of each balloon. Further, the central control system 300 can use altitudinal wind data to determine respective altitude adjustments that can be initiated in order to achieve the movement towards the desired topology.

Accordingly, the arrangement shown in FIG. 3 provides for coordinating communications between the central control system 300 and the balloon network 304. This arrangement can be useful to provide centralized control for a balloon network that covers a large geographic area. When expanded, this arrangement can support a global balloon network, which can provide global coverage.

This disclosure contemplates arrangements other than the arrangement shown in FIG. 3. For example, an arrangement can include a centralized control system, regional control systems, and sub-region systems. The sub-region systems can serve to provide communications between the centralized control system and the corresponding regional control systems. As another example, control functions of a balloon network can be provided by a single, centralized, control system. The control system can communicate directly with one or more downlink balloons.

The central control system 300 and the regional control systems 302A-302C need not control and coordinate all of the functions of the balloon network 304. In an implementation, a ground-based control system and a balloon network can share control and coordination of the balloon network. In another implementation, the balloon network itself can control and coordinate all of the functions of the balloon network. Accordingly, in this implementation, the balloon network can be controlled without a need for ground-based control. To this end, certain balloons can be configured to provide the same or similar functions as those discussed above in connection with the central control system 300 and the regional control systems 302A-302C.

In addition, control of a balloon network, coordination of the balloon network, or both can be de-centralized. For example, each balloon in a balloon network can exchange state information with nearby balloons. When the balloons exchange state information in this way, each balloon can individually determine the state of the network. As another example, certain balloons in a balloon network can serve as aggregator balloons. The aggregator balloons can aggregate state information for a given portion of the balloon network. The aggregator balloons can coordinate with one another to determine the overall state of the network.

Control of a balloon network can be localized in a way that the control does not depend on the overall state of the network. For example, balloons in a balloon network can implement station-keeping functions that only consider nearby balloons. In particular, each balloon can implement an energy function that takes into account the balloon's own state and the states of nearby balloons. The energy function can be used to maintain the balloon at a desired position or to move the balloon to a desired position in relation to nearby balloons, without considering the desired topology of the balloon network as a whole. When each balloon in the balloon network implements an energy function in this way, the balloon network as a whole can maintain a desired topology or move towards a desired topology.

For example, assume that a given balloon $B_0$ receives distance information $d_1, d_2, d_3, \ldots, d_k$. The distance information $d_1$ represents the distance from the balloon $B_0$ to its neighboring balloon $B_1$. Likewise, the distance information $d_2$ represents a distance from the balloon $B_0$ to its neighboring balloon $B_2$, the distance $d_3$ represents a distance from the balloon $B_0$ to its neighboring balloon $B_3$, and the distance $d_k$ represents a distance from the balloon $B_0$ to its neighboring balloon $B_k$. Accordingly, the distance information represents distances from the balloon to its k closest neighbors. The balloon $B_0$ can treat the distance to each of the k balloons as a virtual spring with vector representing a force direction from the first nearest neighbor balloon i toward balloon $B_0$ and with force magnitude proportional to $d_i$. The balloon $B_0$ can sum each of the k vectors to obtain a summed vector that represents desired movement of the balloon $B_0$. The balloon $B_0$ can attempt to achieve the desired movement by controlling its altitude, as discussed above. This is but one technique for assigning force magnitudes; this disclosure contemplates that other techniques can also be used.

D. Balloon Network with Optical and RF Links Between Balloons

Figure 4:
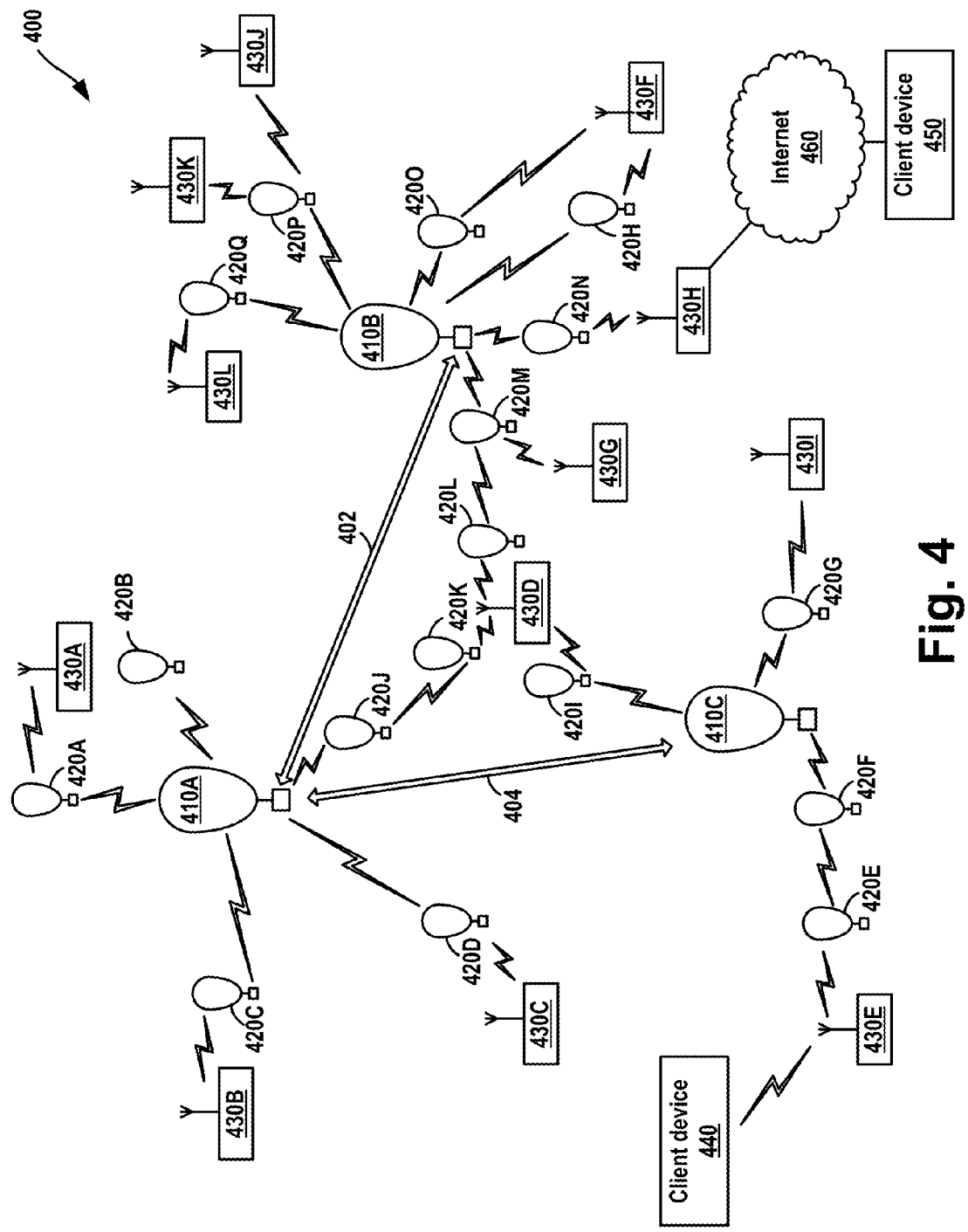
FIG. 4 illustrates a balloon network that includes super-nodes and sub-nodes, according to an embodiment.

A balloon network can include super-node balloons (or simply "super nodes") and sub-node balloons (or simply "sub-nodes"). The super-nodes can communicate with one another by way of optical links. The sub-nodes can communicate with super-nodes by way of RF links. FIG. 4 illustrates a balloon network 400 that includes super-nodes 410A-410C and sub-nodes 420A-420Q, according to an embodiment.

Each of the super-nodes 410A-410C can be provided with a free-space optical communication system that is operable for packet-data communication with other super-node balloons. Accordingly, super-nodes can communicate with one another by way of optical links. For example, the super-node 410A and the super-node 410B can communicate with one another by way of an optical link 402. Likewise, the super-node 410A and the super-node 410C can communicate by way of an optical link 404.

Each of the sub-nodes 420A-420Q can be provided with a radio-frequency (RF) communication system that is operable for packet-data communication over an RF air interface. In addition, some or all of the super-nodes 410A-410C can include an RF communication system that is operable to route packet data to one or more of the sub-nodes 420A-420Q. For example, when the sub-node 420A receives data from the super-node 410A by way of an RF link, the sub-node 420A can use its RF communication system to transmit the received data to a ground-based station 430A by way of an RF link.

In an embodiment, all of the sub-node balloons 420A-420Q can be configured to establish RF links with ground-based stations. For example, all of the sub-nodes 420A-420Q can be configured similarly to the sub-node 420A, which is operable to relay communications between the super-node 410A and the ground-based station 430A by way of respective RF links.

In an embodiment, some or all of the sub-nodes 420A-420Q can be configured to establish RF links with other sub-nodes. For example, the sub-node 420F is operable to relay communications between the super-node 410C and the sub-node 420E. In this embodiment, two or more sub-nodes can provide a multi-hop path between a super-node and a ground-based station. For example, a multi-hop path is provided between the super-node 410C and the ground-based station 430E by way of the sub-node balloons 420E and 420F.

Note that an RF link can be a directional link between a given entity and one or more other entities, or an RF link can be part of an omni-directional broadcast. In the case of an RF broadcast, one or more "links" can be provided by way of a single broadcast. For example, the super-node 410A can establish a separate RF link with each of the sub-nodes 420A-420C. Instead, the super-node 410A can broadcast a single RF signal that can be received by the sub-nodes 420A, 420B, and 420C. The single RF broadcast can in effect provide all of the RF links between the super-node balloon 410A and the sub-node balloons 420A-420C.

Some or all of the super-nodes 410A-410C can serve as downlink balloons. In addition, the balloon network 420 can be implemented without the use of any of the sub-nodes 420A-420Q. In addition, in an embodiment, the super-nodes 410A-410C can collectively function as a core network (or, in other words, as a backbone network), while the sub-nodes 420A-420Q can function as access networks to the core network. In this embodiment, some or all of the sub-nodes 420A-420Q can function as gateways to the balloon network 400. Note that some or all of the ground-based stations 430A-430L can also, or instead, function as gateways to the balloon network 400.

The network topology of the balloon network 400 is but one of many possible network topologies. Further, the network topology of the balloon network 400 can vary dynamically, as super-nodes and sub-nodes move relative to the ground, relative to one another, or both.

IV. Methods for the Altitude Control for a Super Pressure Aerostatic Balloon

Figure 5:
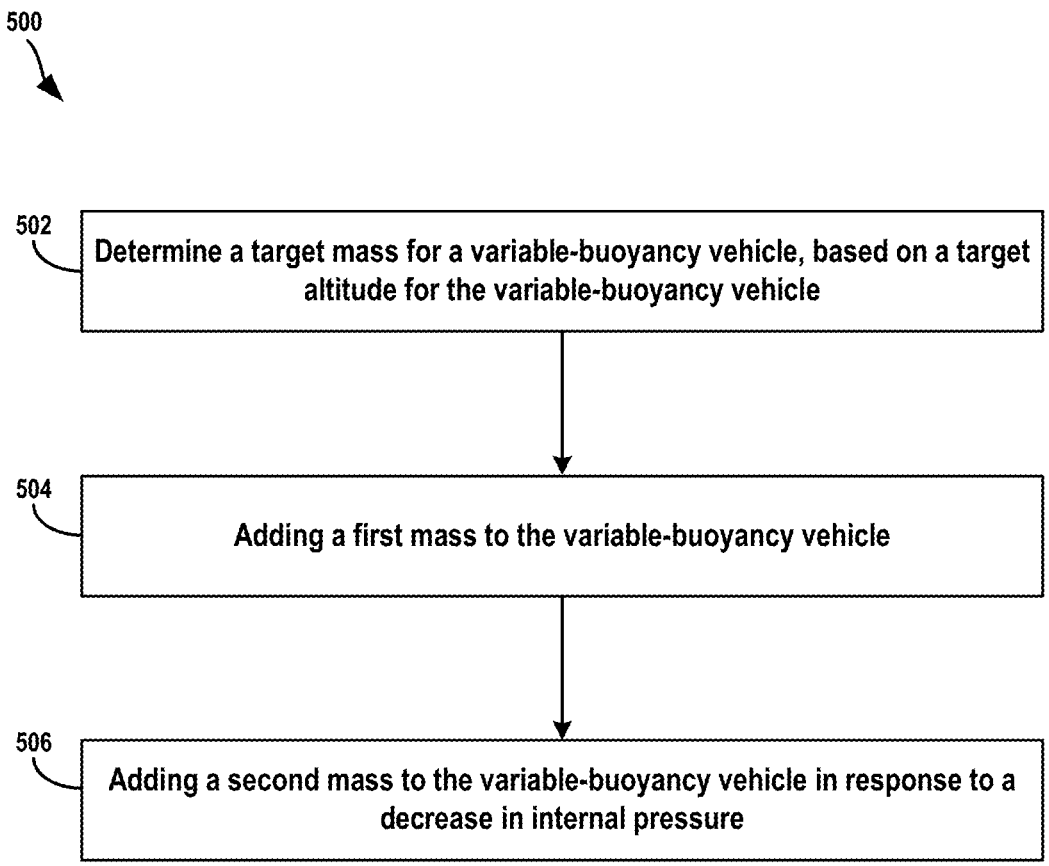
FIG. 5 illustrates a method for the altitude control for a super pressure aerostatic balloon.

FIG. 5 illustrates a method for the altitude control for a super pressure aerostatic balloon. In particular, method 500 can be used with the balloon systems previously discussed with respect to FIGS. 1-4, such as the balloon network 400 discussed above in connection with FIG. 4. The method 500 may be used to reduce the power usage of the balloon. By reducing the power usage of the balloon, the flight time of the balloon may be extended. In some examples, a pump associated with the balloon may use on the order of 300 Watts of energy when operating. The pump may be one of the most energy-expensive components of the balloon system. Therefore, by minimizing the energy usage of the pump, the overall system energy may be reduced by reducing the energy used by one of the most energy-expensive component of the balloon system.

The energy usage of the pump may be reduced in several ways. First, the pump may have an optimal operation mode. In the optimal operation mode, the pump may be able to add air to the balloon in the most energy efficient way. In some examples, the optimal operation mode may specify a fill rate or operation speed of the pump. In further examples, the optimal operation mode may be based on a difference in pressure between the inside and outside of the balloon. Second, the pump may be operated in a mode where it is enabled and disabled with a timing to reduce the energy usage. This mode will be discussed further with respect to method 500 below. In another example, both the optimal operation mode and selectively enabling and disabling the pump may be combined for efficient operation.

Further, method 500 is presented in the context of adding mass to a balloon to reduce the altitude. However, method 500 may also be used with removing mass to increase the altitude of the balloon. In some embodiments, method 500 may be performed at least in part by the previously discussed centralized control system. However, the balloon itself may perform some or all of method 500.

For example, method 500 may be performed by the centralized control system described in FIG. 3. Note that by relying on such a centralized control system, a balloon may reduce its power usage. In another example, if a balloon detects the loss of the communication link between the balloon and a centralized control system or another system that is performing method 500 on behalf of the balloon, then the balloon may take over for the control system and perform some or all of method 500 on its own.

At block 502, the method 500 determines a target mass for a variable-buoyancy vehicle, based on a target altitude for the variable-buoyancy vehicle. In a super pressure system, the volume of a balloon is relatively fixed. However, by adding or removing air from the balloon, the system can adjust an internal pressure within the balloon. The altitude at which the balloon flies is a function of the pressure (and therefore mass) inside the balloon. Thus, for any given altitude there is an associated balloon pressure that is needed to fly at the given altitude. Thus, in an example embodiment, block 502 may involve the balloon determining the associated balloon pressure for flying at the target altitude.

Note that as a precursor to block 502, the target altitude for the balloon may be determined. Herein, the target altitude for a balloon should be understood to be an altitude that a balloon should move up or down to from its current altitude (assuming the balloon is not already flying at the target altitude. The target altitude may be determined by a fleet planning system or by another system, based on various criteria. Alternatively, a balloon may determine its own target altitude.

Once the target mass has been calculated at block 502, the target mass can be compared to the present mass of the balloon. Based on the difference between the target mass and the present mass, a target change in mass may be calculated. To increase the altitude of the balloon, the target mass will be less than the present mass. To decrease the altitude of the balloon, the target mass will be greater than the present mass.

Information about the current balloon mass and current altitude may be obtained based on sensor data from the balloon sensors, such as sensors 128. Sensor data may either be (i) provided from the sensors to a processor or (ii) read from the sensor by the processor (e.g. sensors may either be actively providing data or they may passive sensors that must be read). The sensors may provide information such as an ambient pressure and balloon velocity. The ambient pressure sensor measures the air pressure in the environment surrounding the balloon. The velocity sensor provides data indicative of the velocity of the balloon. In some embodiments, the velocity sensors may provide velocity with respect to each axis in the three-axis coordinate system (e.g. an X-, Y-, and Z-velocity).

Further, the sensors also provide location data. The location data provides information relating to the location of the balloon. The location data may be used to locate the balloon at a specific position on the Earth (i.e. a global location). However, in other embodiments, the location data may be data indicative of a relative position. For example, a balloon may not know its exact global location, but it knows its location with respect to another object (or balloon). Thus, the location data from the sensors may be a relative location.

In various embodiments, the sensor data may be received (or measured) either continuously or periodically. Further, the sensor data may be received either continuously or periodically. For example, the rate at which sensor data is communicated may be based on current balloon parameters, such as a current altitude and velocity of the balloon. For example, if a balloon is configured to hold a specific altitude, sensor data may be configured to be received periodically. In one embodiment, sensor data is received every 5 minutes. However, when the balloon is changing altitude, sensor data may be configured to be received continuously. Alternatively, when the balloon is changing altitude, sensor data may be configured to be received with a shorter period than when the balloon is holding a specific altitude. For example, sensor data may be received every 30 seconds while the balloon is changing altitude. The amount of time stated above for each example is merely one example, other times may be used in each situation as well.

In some embodiments, sensor data is first received by a processor on the balloon and responsively transmitted wirelessly for further processing. Before being transmitted for further processing, the sensor data may be compressed for ease of transmission. The sensor data may be transmitted to the centralized control system, as previously discussed. In another embodiment, the sensor data may be transmitted to a networked processing server, or other computing device for further processing.

In some embodiments, a processor within the centralized control system estimates current balloon parameters based on the received sensor data. The balloon parameters include the current altitude and vertical velocity of the balloon. Further, the balloon parameters may also include the global location of the balloon as well. Moreover, in some embodiments, the balloon parameters also include the horizontal velocity. However, the horizontal velocity may be omitted from the balloon parameters in various embodiments. Thus, the balloon parameters may be considered to have a 1-dimension motion (e.g. position and speed along a vertical line, perpendicular to the surface of the Earth) and a specific location.

When the centralized control system receives the sensor data, it will process the data to determine the balloon parameters. For example, the output of the pressure sensor may be used to calculate the altitude of the balloon. Additionally, a GPS sensor may provide location data that can be used to help determine the balloon parameters. Further, the output of the velocity sensors may be used to determine the velocity component of the balloon parameters. The centralized control system will compile the data from the various sensors to determine the balloon parameters.

In some alternate embodiments, a processor that is mounted on the balloon system estimates the balloon parameters. The processor may estimate the balloon parameters and transmit the balloon parameter information for further processing. Thus, in this embodiment the balloon is configured to communicate processed parameter information from the sensors, rather than the sensor data. The processor on the balloon may calculate an estimated balloon parameters in the same way as the centralized control system estimates the balloon parameters. However, in other embodiments, the processor on the balloon may use less computationally intensive algorithms to calculate the balloon parameters. By using less computationally intensive algorithms, the processor on the balloon may use less power. The less computationally intensive algorithm may either result in a less accurate parameter estimate (as compared to the centralized control system estimate) or it may result in the calculation being performed more slowly.

Additionally, block 502 may include either determining or receiving desired final balloon parameters. Typically, the final balloon parameters includes a new altitude for the balloon and zero vertical movement (e.g. a parameter change for the balloon involves changing the steady-state balloon altitude).

The final balloon parameters may be determined based on a variety of factors. In one embodiment, the balloon parameters may be varied based on ambient wind conditions. Wind conditions in the atmosphere may vary greatly depending on altitude. Thus, it may be desirable for the balloon to adjust its altitude to take advantage of wind conditions. The balloon altitude may be adjusted based on a wind speed, wind direction, or other criteria. The wind conditions that evoke a change in balloon altitude may be the condition at the current altitude, the desired altitude, or both. For example, wind information may be communicated to the balloon in order to adjust the altitude of the balloon to move the balloon to an altitude with a wind in the correct direction to reposition the balloon.

In an additional embodiment, in some areas there may be restrictions on the altitude at which a balloon can fly. When the balloon approaches this area, final balloon parameters are determined to ensure the balloon is flying within an appropriate designated altitude. In another embodiment, the balloon may have a radio link with other balloons, a ground base station, or a satellite. Final balloon parameters may be determined in order to adjust a radio link. In yet other embodiments, the final balloon parameters may be determined based on external factors, such as weather or other criteria. How exactly the final balloon parameters are determined is not critical to the present application.

At block 504, the method 500 includes adding a first mass to the balloon. The first mass added to the balloon is based on the target change in mass. The first mass added is an amount of mass that is less than the target change in mass. When the first mass is added, it initially causes an increase in the internal pressure of the balloon. In response to the increase in internal pressure of the balloon, the balloon decreases altitude. However, the amount of the first mass may be sufficient enough to cause the balloon to decrease in altitude further than the steady-state altitude (as shown, and will be later described with respect to, FIG. 6). Because the movement of the balloon may cause it to overshoot the steady-state altitude associated with the increase in mass, the pressure within the balloon may fall below the initial balloon-pressure in response to adding the first mass.

In order to perform the requested altitude adjustment, a parameter model of the balloon may be created. The parameter model may have at least 3 variables: (i) the mass of the balloon; (ii) the vertical position of the balloon; and (iii) the vertical speed of the balloon. Both the vertical position and the vertical speed of the balloon are a function of the balloon's mass. The input to the system a filling rate of the balloon; thus, the optimization determines a fill-rate plan for the balloon. The output controlled by the filling rate is the altitude of the balloon. Additionally, the filling rate both (i) determines the balloon's mass and (ii) is controlled with a mass-changing unit. The mass-changing unit is configured to either add or remove air from the envelope of the balloon to increase or decrease the balloon's mass. Air may be added to the balloon with an impeller in the mass-changing unit. The term "impeller" as used herein is to be broadly construed to cover impellers, pumps, and any other devices that could be used to force air towards the inlet ports.

Air may be removed from the balloon either with the impeller or a vent in the mass-changing unit. To add air, the impeller creates a pressure on a valve. When the pressure is greater than the valve threshold, the valve opens, allowing mass in to the balloon. The valve threshold is in part a function of the internal pressure of the balloon. When the pressure in the balloon is lower, the valve takes less pressure to open. When the valve is opened with less pressure, the impeller can use less energy to add mass to the balloon. Conversely, to remove air, the vent opens to release air from the pressure within the balloon. Unlike the impeller, the vent is generally a passive device. In some embodiments, the only energy used by the vent is the opening and closing mechanism. Whereas the impeller requires energy to operate.

In one embodiment, the air mass fill and release mechanism includes an impeller housing disposed within a fixed housing, which in turn is coupled to the balloon envelope. The impeller housing is moveable relative to the fixed housing. The impeller housing and the fixed housing form a seal in a closed position, whereas, in an open position, the impeller housing defines an unobstructed airflow passageway between an internal chamber in a balloon envelope and the atmosphere. Air may be forced into the bladder with a pump or impeller disposed in the impeller housing. Alternatively, air may be forced out of the bladder with the pump or impeller or the air may simply exit due to the pressure differential between the bladder and atmosphere.

In addition, the impeller housing may creates efficiencies in air flow by providing both an airflow seal and an unobstructed airflow passageway between the balloon envelope and the atmosphere. Specifically, in various embodiments, the impeller housing comprises a hollow cylindrical body with a first end and a second end and a plate having a periphery is coupled to the first end of the impeller housing. A flange extends radially outward from the impeller housing below the plate. A plurality of vents are defined in the impeller housing between the plate and the flange, and the airflow passageway is defined from the second end of the impeller housing through the hollow cylindrical body of the impeller housing to the second plurality of vents. An impeller or a pump is disposed within the impeller housing between the first end and the second end of the impeller housing.

In operation, the plate is movable relative to the fixed housing from a closed position to an open position. For example, the periphery of the plate mates with the periphery of the first end of the fixed housing to form a seal in the closed position. In the open position, the plate and at least a portion of the plurality of vents in the impeller housing extend into the balloon envelope. This open position provides fluid communication between atmosphere and an internal chamber of the balloon envelope via the airflow passageway in the impeller housing.

Further, when it is desired to add air to the bladder, the impeller is turned on and air is forced towards the sealing plate prior to moving the impeller housing into the open position. This prevents air in the balloon envelope from prematurely evacuating. The fixed housing beneficially provides a plurality of vents in its sidewall to alleviate airflow back pressure on the impeller or pump before the impeller housing is moved into the open position. Once the spinning impeller reaches operating speed, one or more actuators are activated. Activating the actuators causes the impeller housing to disengage from the periphery of the first end of the fixed housing. As a result of this disengagement, the seal between the plate and the fixed housing is opened allowing air to move through the airflow passageway between the atmosphere and the balloon. The operating speed of the impeller is calculated such that the force of the resulting airflow is greater than the force of the air mass acting on the top surface of the plate (e.g., back pressure from the bladder). When a desired quantity of air has been moved into the bladder, the linear actuators are activated to lower the impeller housing, while the impeller is still spinning.

In still other embodiments, the balloon includes provide a fill mechanism that includes a passive valve system that does not require electrical activation. In particular, a plate having one or more inlet ports is provided that may be attached to the balloon beneath the balloon envelope and the bladder positioned within the balloon envelope. A housing is positioned beneath the plate having an end that is positioned about the one or more inlet ports. A pump or impeller is positioned within the housing that is used to force air towards and through the one or more inlet ports in the plate and into the bladder of the balloon.

When it is desired to add air to the bladder, the impeller is turned on and air is forced towards the inlet ports in the plate. The force of the air moved towards the inlet ports by the impeller causes a pressure against the bottom of the umbrella valve. As the impeller operates, the force on the bottom of the umbrella valve caused by the air moved towards the inlet ports by the impeller becomes greater than the force of the air pressure within the bladder acting on the top of the umbrella valve, causing the periphery of the umbrella valve to disengage from the periphery of the inlet port. As a result of this disengagement, the seal between the umbrella valve and the periphery of the inlet port is opened allowing air to be forced through the inlet port and into the bladder. The passive valve system provided herein allows the inlet ports to be opened and closed without requiring electrical actuation of a valve, therefore eliminating the possibility of an electrical malfunction. In addition, the inlet ports may be opened and closed without requiring a valve having moving parts, therefore eliminating the possibility of having a valve that becomes "stuck" in an open or closed position. As a result, reliable operation of the air mass fill mechanism may be provided throughout the extreme temperatures that are encountered in operation.

At Block 506, a second mass is added to the balloon in response to the pressure in the balloon dropping below a threshold. As previously discussed, when the first mass is added to the balloon, the pressure inside the balloon increase causing the balloon altitude to decrease. While the balloon is moving from its initial altitude to the steady-state altitude associated with the added first mass, it may overshoot the steady-state altitude of the balloon with the initial mass plus the added first mass. As the altitude of the balloon decreases, the pressure within the balloon decreases as well. As the balloon altitude decreases, it may overshoot the steady-state altitude associated with the mass increase. When the balloon overshoots the steady-state altitude, the pressure within the balloon may be lower the initial balloon pressure, and the balloon will naturally rise back towards the steady-state altitude. However, this drop in pressure also makes it easy or for the impeller to add mass the balloon (due to the valve threshold decreasing in response to the decrease in balloon pressure). Because it is easier to add mass to the balloon, the impeller will use less energy to add the second mass (as compared to if the same amount of mass was added at the same time the first mass was added).

Put in simpler terms, by adding the first mass, waiting period of time for the pressure to drop within the balloon, and adding a second mass, the total amount of energy used to add the total mass will be less than the amount of energy needed to add the total mass at once. Thus, the balloon will move a more energy efficient manner.

The total amount of energy required adding mass to the balloon changes because of a change in differential pressure (i.e. the difference in pressure between the air inside of the balloon and the air external to the balloon) as the altitude of the balloon moves. Typically, the inside of the balloon has a higher pressure than the outside of the balloon. When the first mass is added to the balloon, the balloon will decrease in altitude. As the balloon decreases in altitude, the balloon will also cool down. This cooling of the balloon (and the air inside the balloon) causes the differential pressure between the inside of the balloon and the outside of the balloon to decrease. As the differential pressure decreases, air can be added to the balloon more easily.

In one example, the ambient temperature of the air surrounding the balloon may be 216 Kelvin (K). The inside of the balloon may be approximately 236 K to 246 K. Because air pressure is a function of temperature, the inside of the balloon has a higher pressure than the air outside the balloon. The balloon system may cause the pump to add mass to the balloon. In one embodiment, mass may be added as a given rate, such as 5 grams per second, in order to make the balloon decrease altitude over a threshold amount, such as 100 meters. In another embodiment, mass may be added as a given rate, such as 5 grams per second, in order to make the balloon decrease altitude at a rate of 1 meter per second. Further, as the balloon changes altitude, the temperature inside of the balloon may change from approximately 236 K to 246 K down to about 221 K to 226 K. The temperature change of the inside of the balloon represents approximately a 10% change in absolute temperature of the inside of the balloon.

In both example embodiments, the balloon may continue to decrease in altitude until the temperature outside of the balloon is within 5 degrees of the internal pressure of the balloon. Thus, as the temperature difference decreases, so does the differential pressure. As the differential pressure decreases, the amount of energy needed to add mass to the balloon decreases as well. In some additional examples, the balloon may be configured to adjust the altitude in a relatively quick manner, such as decreasing in about 5 minutes, in order for any other thermal effects to be mitigated.

In some embodiments, the balloon will actively monitor the pressure within the balloon and only add the mass once the pressure falls below the threshold. Active monitoring maybe a continuous monitoring of the pressure or a periodic monitoring the pressure, such as monitoring the balloon every few seconds (or minutes). In a different embodiment, a computer system can predict the pressure in the balloon as a function of time (after the first mass is added). In this embodiment the balloon will wait a determined amount of time before adding the second mass. The amount of time is equal to an amount of time the computer predicts it will take for the pressure to fall approximately to the threshold pressure.

Figure 6:
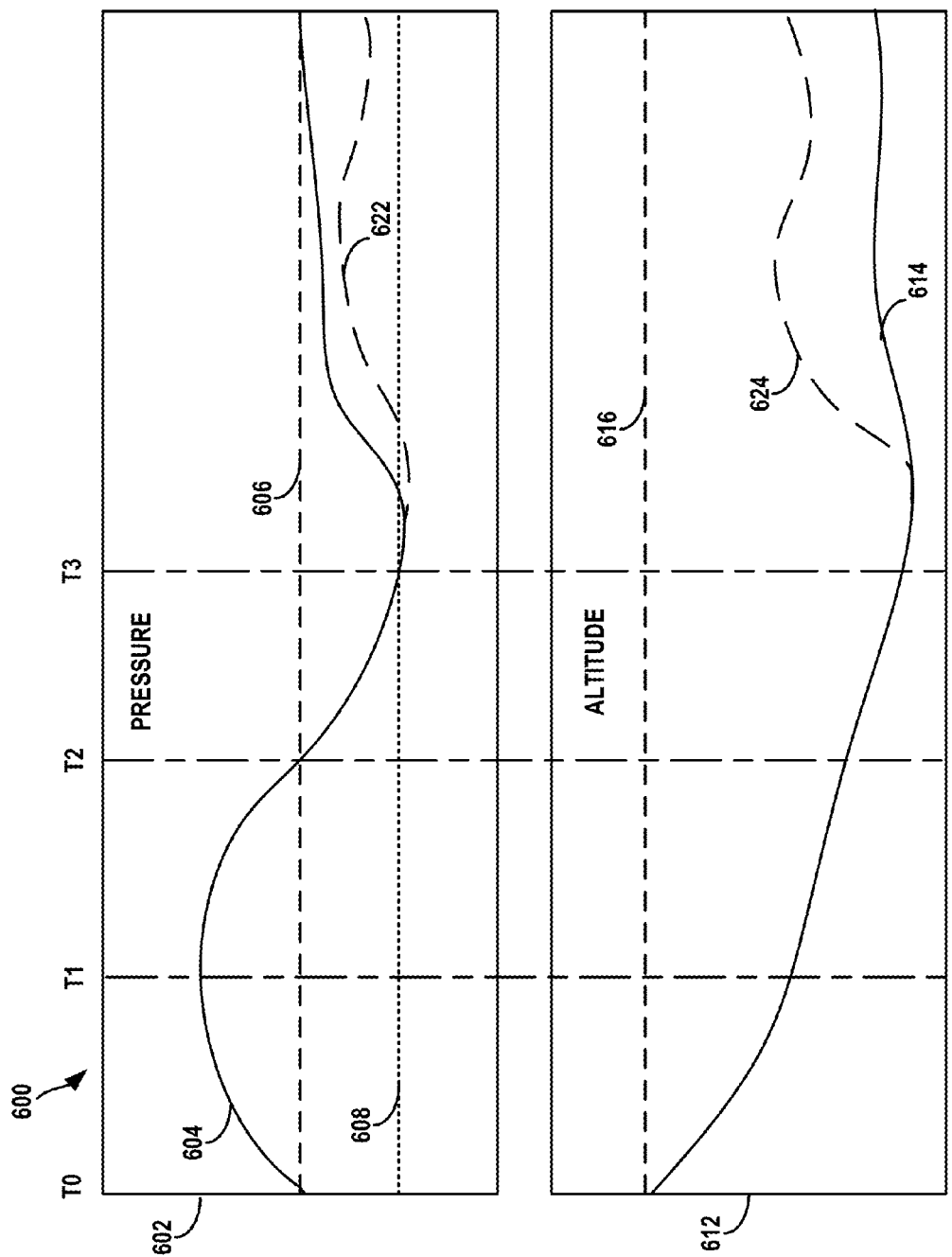
FIG. 6 illustrates an example chart describing the internal pressure and altitude of a balloon changing states.

FIG. 6 illustrates an example parameter chart 600 describing the internal pressure 602 and altitude 612 of a balloon changing altitudes. The example shown in FIG. 6 is one example of the operation of present disclosure. The exact curves are not mandatory to practice the disclosure but show one set of operating conditions. The output of the system is given by chart 612. In the present system, the output is the altitude of the balloon. Chart 602 shows the variable to the system. Here, the variable is internal pressure of the balloon.

In the example shown by chart 600, at a time T0, the balloon has an initial pressure as indicated by line 606 and an altitude indicated by line 616. At time T0, the impeller begins to add the first amount of mass to the balloon. Mass is added by the impeller from time T0 until time T1. As mass is being added, the pressure in the balloon (as shown by curve 604) increases and the balloon decreases in altitude (as shown by curve 614).

At time T1, the impeller stops adding mass to the balloon. In response to the mass in the balloon no longer changing, the pressure in the balloon begins to decline as the balloon drops in altitude. From time T1 until time T2, the balloon has an internal pressure greater than the initial pressure. At time T2, the internal pressure in the balloon is equal to the initial pressure in the balloon. This is due to the new altitude of the balloon, as indicated by curve 614.

Between time T2 and time T3, the balloon has an internal pressure that is less than the initial pressure of the balloon. However, the balloon has yet to reach the threshold pressure. Additionally, between time T2 and time T3, the balloon's altitude continues to decrease. The balloon's altitude continues to decrease because the movement from one altitude to another may include a bit of on oscillation while the balloon settles at the steady-state altitude. During normal operation, after mass is added (or removed) the balloon will oscillate around the new altitude for a period of time before it settles on the final altitude. In the present disclosure, there is no oscillation shown because additional mass is added before the first oscillation cycle is complete.

At time T3, the balloon reaches the threshold pressure 608. When the threshold pressure 608 is met, the impeller begins to add more mass to the balloon in order to reach the target balloon mass. Because the internal pressure at time T3 is below the pressure at time T0, the impeller uses less energy to add mass to the balloon when the balloon has the lower pressure, therefore saving energy. After time T3, the pressure in the balloon increases. Additionally, in the embodiment shown in FIG. 6, the altitude of the balloon begins to steady as more mass is added. The final steady-state altitude is not shown as part of FIG. 6.

Additionally, the line 622 shows what would have happened to the pressure in the balloon if the second mass were not added at time T3. There would have been an oscillation of the internal pressure within the balloon. Additionally, line 624 shows what the altitude of the balloon would have done if the second mass was not added at time T3. As shown by line 624, the altitude of the balloon would have increased after time T3. The altitude would have oscillated around the steady state altitude associated with the mass of the balloon including the first added mass.

In the example shown in FIG. 6, the threshold pressure 608 is one example of a threshold pressure. In various embodiments, the threshold pressure 608 may be determined in various ways. For example, the threshold pressure 608 may be determined to be a percentage of the initial pressure (e.g., the threshold is met when the internal pressure of the balloon drop by 3% from the initial pressure). In another example, the threshold pressure 608 may be determined based on the pressure curve (e.g., curve 604). The threshold may be met when the pressure curve has a first derivative that is approximately zero and the second derivative is positive. This would indicate when the balloon has reached a minimum of the internal pressure. In yet another example, the threshold may be an inflection point of the curve 604. An inflection point is the point where the second derivative changes sign from positive to negative (or negative to positive). In various other embodiments, the threshold pressure 608 may be set in a variety of other ways.

There are various other ways the altitude of the balloon may be adjusted. Similar to that shown in FIG. 6, the balloon may move in a manner that may be plotted on a parameter chart similar to parameter chart 600. As disclosed herein, the present disclosure includes adding a first amount of mass and adding a second amount of mass when the internal pressure decreases below a threshold. The specific movement shown in FIG. 6 is not meant to be a limiting movement.

V. Computing Device and Computer Program Product

Figure 7:
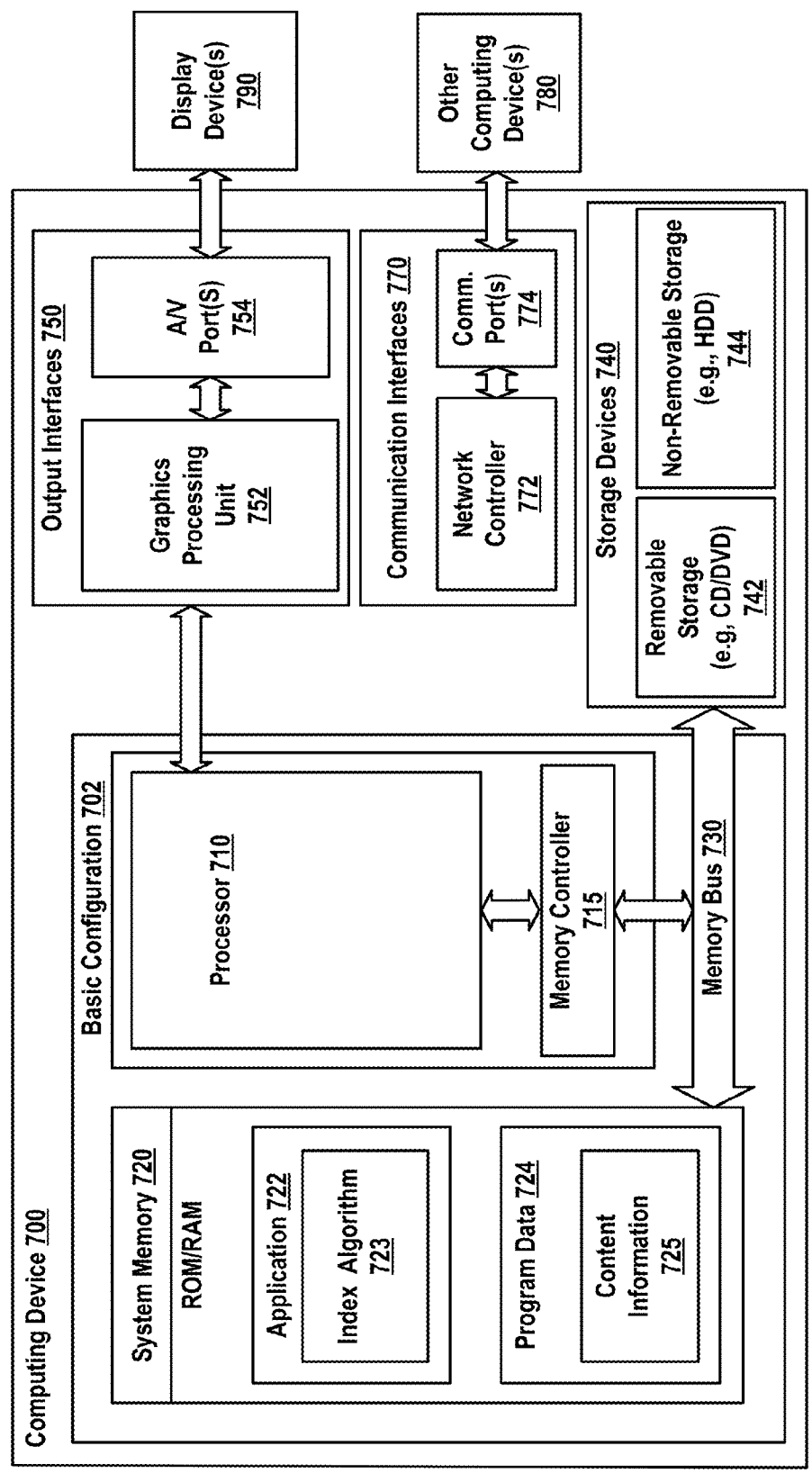
FIG. 7 illustrates a functional block diagram of a computing device, according to an embodiment.

FIG. 7 illustrates a functional block diagram of a computing device 700, according to an embodiment. The computing device 700 can be used to perform functions in connection with adjusting the altitude of a balloon in a balloon network. In particular, the computing device can be used to perform some or all of the functions discussed above in connection with FIGS. 1-6.

The computing device 700 can be or include various types of devices, such as, for example, a server, personal computer, mobile device, cellular phone, custom computing device, or tablet computer. In a basic configuration 702, the computing device 700 can include one or more processors 710 and system memory 720. A memory bus 730 can be used for communicating between the processor 710 and the system memory 720. Depending on the desired configuration, the processor 710 can be of any type, including a microprocessor (µP), a microcontroller (µC), or a digital signal processor (DSP), among others. A memory controller 715 can also be used with the processor 710, or in some implementations, the memory controller 715 can be an internal part of the processor 710.

Depending on the desired configuration, the system memory 720 can be of any type, including volatile memory (such as RAM) and non-volatile memory (such as ROM, flash memory). The system memory 720 can include one or more applications 722 and program data 724. The application(s) 722 can include an index algorithm 723 that is arranged to provide inputs to the electronic circuits. The program data 724 can include content information 725 that can be directed to any number of types of data. The application 722 can be arranged to operate with the program data 724 on an operating system.

The computing device 700 can have additional features or functionality, and additional interfaces to facilitate communication between the basic configuration 702 and any devices and interfaces. For example, data storage devices 740 can be provided including removable storage devices 742, non-removable storage devices 744, or both. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives. Computer storage media can include volatile and nonvolatile, non-transitory, removable and non-removable media implemented in any method or technology for storage of information, such as computer readable instructions, data structures, program modules, or other data.

The system memory 720 and the storage devices 740 are examples of computer storage media. Computer storage media includes, but is not limited to, RAM, ROM, EEPROM, flash memory or other memory technology, CD-ROM, DVDs or other optical storage, magnetic cassettes, magnetic tape, magnetic disk storage or other magnetic storage devices, or any other medium that can be used to store the desired information and that can be accessed by the computing device 700.

The computing device 700 can also include output interfaces 750 that can include a graphics processing unit 752, which can be configured to communicate with various external devices, such as display devices 790 or speakers by way of one or more A/V ports or a communication interface 770. The communication interface 770 can include a network controller 772, which can be arranged to facilitate communication with one or more other computing devices 780 over a network communication by way of one or more communication ports 774. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR), and other wireless media.

The computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 700 can also be implemented as a personal computer including both laptop computer and non-laptop computer configurations.

Figure 8:
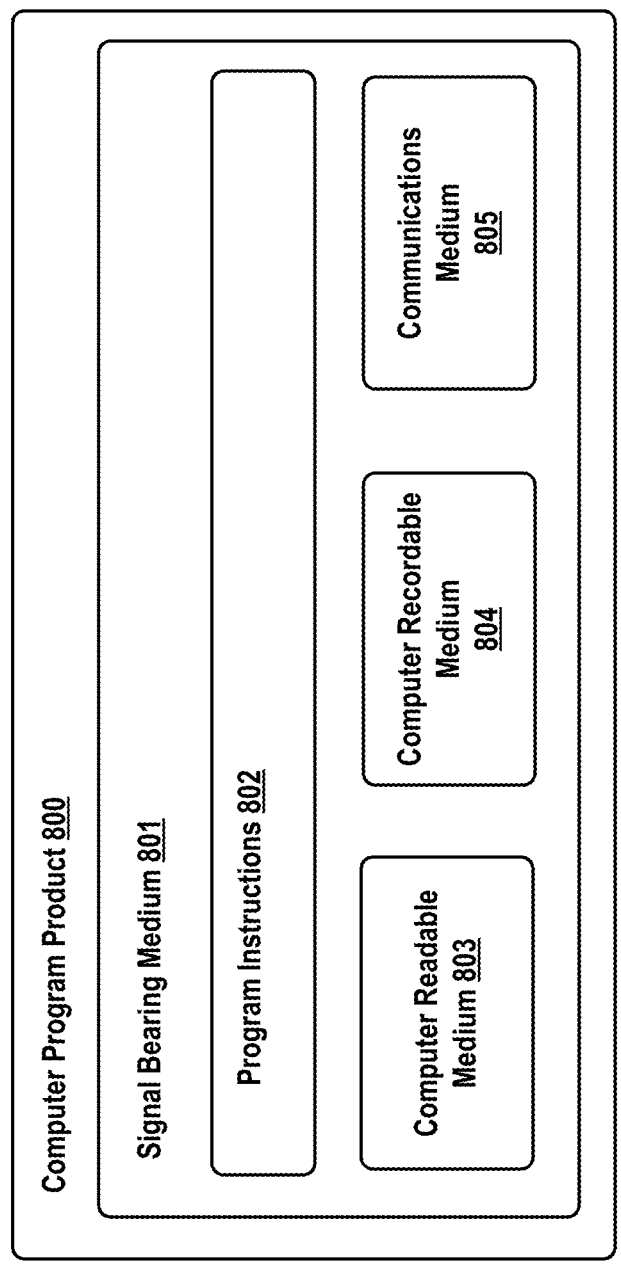
FIG. 8 illustrates a computer program product, according to an embodiment.

The disclosed methods can be implemented as computer program instructions encoded on a non-transitory computer-readable storage medium in a machine-readable format, or on other non-transitory media or articles of manufacture. FIG. 8 illustrates a computer program product 800, according to an embodiment. The computer program product 800 includes a computer program for executing a computer process on a computing device, arranged according to some disclosed implementations.

The computer program product 800 is provided using a signal bearing medium 801. The signal bearing medium 801 can include one or more programming instructions 802 that, when executed by one or more processors, can provide functionality or portions of the functionality discussed above in connection with FIGS. 1-6. In some implementations, the signal bearing medium 801 can encompass a computer-readable medium 803 such as, but not limited to, a hard disk drive, a CD, a DVD, a digital tape, or memory. In some implementations, the signal bearing medium 801 can encompass a computer-recordable medium 804 such as, but not limited to, memory, read/write (R/W) CDs, or R/W DVDs. In some implementations, the signal bearing medium 801 can encompass a communications medium 805 such as, but not limited to, a digital or analog communication medium (for example, a fiber optic cable, a waveguide, a wired communications link, or a wireless communication link). Thus, for example, the signal bearing medium 801 can be conveyed by a wireless form of the communications medium 805 (for example, a wireless communications medium conforming with the IEEE 802.11 standard or other transmission protocol).

The one or more programming instructions 802 can be, for example, computer executable instructions. A computing device (such as the computing device 700 of FIG. 7) can be configured to provide various operations in response to the programming instructions 802 conveyed to the computing device by one or more of the computer-readable medium 803, the computer recordable medium 804, and the communications medium 805.

While various examples have been disclosed, other examples will be apparent to those skilled in the art. The disclosed examples are for purposes of illustration and are not intended to be limiting, with the true scope and spirit being indicated by the following claims.

What is claimed is:

1. A method for adjusting a variable-buoyancy vehicle comprising:
   determining a target mass for a variable-buoyancy vehicle having an initial internal pressure and an initial altitude, based on a target altitude for the variable-buoyancy vehicle, wherein the target altitude is lower than the initial altitude;
   adding a first mass of air to the variable-buoyancy vehicle, wherein the mass added is less than a difference between the target mass and an initial mass, and wherein the mass added causes an internal pressure of the variable-buoyancy vehicle to increase; and
   in response to in the internal pressure of the variable-buoyancy vehicle decreasing below the initial internal pressure based on a current altitude of the variable-buoyancy vehicle being lower than the initial altitude, adding a second mass of air to the variable-buoyancy vehicle, wherein the pressure of the variable-buoyancy vehicle decreased based on the first adding mass, wherein the second mass added makes a current mass of the variable-buoyancy vehicle approximately equal to the target mass.

2. The method of claim 1, further comprising determining the internal pressure of the variable-buoyancy vehicle after adding the first mass.

3. The method of claim 1, wherein the decrease in the internal pressure has an associated delay time.

4. The method of claim 3, wherein the second mass is added after the delay time.

5. The method of claim 2, wherein the second mass is added in response to the internal pressure falling below a threshold.

6. The method of claim 5, wherein the threshold is selected based on a power consumption of a pump of the variable-buoyancy vehicle.

7. The method of claim 5, wherein the threshold is selected based on an inflection point of a pressure curve of the internal pressure of the variable-buoyancy vehicle.

8. A balloon comprising: an envelope configured to hold air; a bladder configured to hold lift gas, wherein the bladder is located within the envelope; a control unit configured to add or remove air from the envelope in order to change a mass of air in the envelope; and a processing unit configured to:
determine a target mass for the balloon, based on a target altitude for the balloon;
  cause the control unit to add a first mass of air to the balloon, wherein the mass added is less than a difference between the target mass and a current mass; and
  in response to a decrease in an internal pressure of the balloon, cause the control unit to add a second mass of air to the balloon, wherein the pressure of the balloon decreased based on the first adding mass, wherein the second mass of air added makes a current mass of the balloon approximately equal to the target mass.

9. The balloon of claim 8, wherein the processing unit is further configured to determine the internal pressure of the aerostatic balloon after adding the first mass of air.

10. The balloon of claim 8, wherein the decrease in ihe internal pressure has an associated delay time.

11. The balloon of claim 10, wherein the processing unit causes the second mass of air to be added after the delay time.

12. The balloon of claim 9, wherein the processing unit causes the second mass of air to be added in response to the internal pressure falling below a threshold.

13. The balloon of claim 12, wherein the threshold is selected based on a power consumption of the control unit of the balloon.

14. An article of manufacture including a non-transitory computer-readable medium having stored thereon program instructions that, if executed by a processor in a balloon-control system, cause the balloon-control system to perform operations comprising:
  determining a target mass for a variable-buoyancy vehicle, based on a target altitude for the variable-buoyancy vehicle;
  adding a first mass of air to the variable-buoyancy vehicle, wherein the mass added is less than a difference between the target mass and a current mass; and
  in response to a decrease in an internal pressure of the variable-buoyancy vehicle, adding a second mass of air to the variable-buoyancy vehicle, wherein the pressure of the variable-buoyancy vehicle decreased based on the first adding mass, wherein the second mass of air added makes a current mass of the variable-buoyancy vehicle approximately equal to the target mass.

15. The article of manufacture of claim 14, further comprising determining the internal pressure of the variable-buoyancy vehicle after adding the first mass of air.

16. The article of manufacture of claim 14, wherein the decrease in the internal pressure has an associated delay time.

17. The article of manufacture of claim 16, wherein the second mass of air is added after the delay time.

18. The article of manufacture of claim 15, wherein the second mass of air is added in response to the internal pressure falling below a threshold.

19. The article of manufacture of claim 18, wherein the threshold is selected based on a power consumption of a pump of the variable-buoyancy vehicle.

20. The article of manufacture of claim 14, wherein the variable-buoyancy vehicle is an aerostatic balloon.

* * * * *